United States Patent
Dryselius et al.

(10) Patent No.: US 6,378,935 B2
(45) Date of Patent: Apr. 30, 2002

(54) SUN-ROOF APPARATUS

(75) Inventors: Joakim Dryselius, Västra Frölunda; Jonas Göthlin, Torslanda, both of (SE)

(73) Assignee: Volvo Personvagnar AB, Göteborg (SE)

( * ) Notice: Subject to any disclaimer, the term of this patent is extended or adjusted under 35 U.S.C. 154(b) by 0 days.

(21) Appl. No.: 09/681,556

(22) Filed: Apr. 27, 2001

Related U.S. Application Data

(63) Continuation of application No. PCT/SE99/01906, filed on Oct. 22, 1999.

(51) Int. Cl.[7] .............................. B60J 7/00; B60R 13/07; B62D 25/06; B62D 25/07
(52) U.S. Cl. .................................. 296/213; 296/216.06
(58) Field of Search .............................. 296/213, 216.06

(56) References Cited

U.S. PATENT DOCUMENTS

| | | | | |
|---|---|---|---|---|
| 1,596,995 A | * | 8/1926 | Pollard | 296/213 X |
| 3,044,824 A | | 4/1962 | Werner | |
| 3,078,122 A | * | 2/1963 | Werner | 296/216.06 |
| 4,844,532 A | | 7/1989 | Ono et al. | |
| 4,892,351 A | | 1/1990 | Ono et al. | |
| 4,995,665 A | | 2/1991 | Ichinose et al. | |

FOREIGN PATENT DOCUMENTS

| | | | | |
|---|---|---|---|---|
| DE | 3336614 A1 | 4/1985 | | |
| EP | 0510558 A1 | 10/1992 | | |
| GB | 2059884 A | 4/1981 | | |
| JP | 360206724 | * 10/1985 | ............ | 296/216.06 |

* cited by examiner

*Primary Examiner*—Dennis H. Pedder
(74) *Attorney, Agent, or Firm*—Kilpatrick Stockton LLP

(57) ABSTRACT

Sun-roof apparatus for a vehicle (3) including a sun-roof (5), that is arranged in an opening (4) in the roof (2) of the vehicle (3). A link mechanism (11) connects the sun-roof (5) to the roof (2), and a drainage channel (20) and/or a drainage gutter (26) is arranged at least partly around the opening (4) in the roof (2). In relation to a front and rear portion of the vehicle (3), the sun-roof apparatus has a front element (17), a rear element (18) and two side elements (19). The drainage channel (20) and/or the drainage gutter (26) is arranged in the elements (17, 18, 19). That part of the drainage channel (20) and/or the drainage gutter (26) that is arranged in the side elements (19) is inclined in relation to a horizontal plane so that the depth of the drainage channel (20) and/or the drainage gutter (26) in a first end region (21) of the side element (19) is greater than the depth of the drainage channel (20) and/or the drainage gutter (26) in a second end region (22) of the side element (19).

14 Claims, 4 Drawing Sheets

SUN-ROOF APPARATUS

CROSS REFERENCE TO RELATED APPLICATIONS

This is a continuation patent application of International Application Number PCT/SE99/01906 filed Oct. 22, 1999 which designates the United States; the disclosure of that application is expressly incorporated by reference in its entirety.

BACKGROUND OF THE INVENTION

The present invention relates to a sun-roof apparatus for a vehicle that is arranged at an opening in the roof of the vehicle. A link mechanism connects the sun-roof to the roof and a drainage channel and/or drainage gutter is arranged at least partly around the opening in the roof.

When an opening for a sun-roof is made in a vehicle roof, the region around the opening has to be reinforced in order for the vehicle roof to be capable of absorbing forces from the sun-roof. The reinforcement around the opening also contributes to making the vehicle roof torsionally rigid. The sun-roof is also provided with a seal that extends around the periphery of the sun-roof and prevents water from entering the vehicle. The seal around the sun-roof is not always watertight and for this reason is supplemented by a drainage arrangement which receives and carries away water that passes the seal.

Most sun-roof apparatuses in use today have a sun-roof which, in the open position, is pushed in between the roof and the ceiling of the vehicle. There are also sun-roof apparatuses in which the sun-roof moves on top of the roof. In order to make such opening of the sun-roof possible, a guide in the form of an aluminum profile is arranged on both sides of the sun-roof which guide the sun-roof runs on opening and closing of the sun-roof. A separate drainage trough is arranged so as to receive and carry away water to drainage connection pieces which are connected to the drainage trough. The drainage connection pieces are arranged in each corner of the drainage trough and are in turn connected to drainage tubes which conduct the water down through the A and C pillars of the vehicle.

SUMMARY OF INVENTION

The known types of sun-roof apparatus described above comprise a number of components. One object of the present invention is to produce a sun-roof apparatus which comprises fewer components than known sun-roof apparatuses and which thus results in lower cost and weight. Another object of the present invention is to produce a sun-roof apparatus which effectively prevents water penetrating into the vehicle.

This is achieved by virtue of the fact that the sun-roof apparatus, in relation to a front and rear portion of the vehicle, has a front element, a rear element and two side elements. The drainage channel and/or drainage gutter is arranged in these elements. The portion of the drainage channel and/or drainage gutter that is arranged in the side elements is inclined in relation to a horizontal plane so that the depth of the drainage channel and/or drainage gutter in a first end region of the side element is greater than the depth of the drainage channel and/or drainage gutter in a second end region of the side element.

Such a sun-roof apparatus comprises fewer components than known sun-roof apparatuses which results in low material and tool costs.

According to a preferred embodiment of the invention, the drainage channel is positioned in a reinforcing frame arranged around the opening of the roof, and the drainage gutter is arranged at least partly around the opening of the roof; the drainage gutter constituting a part which is integral with the roof.

With this drainage gutter in combination with a sealing system between the glass roof and the roof, effective sealing is achieved between the sun-roof and the roof. Any water which may nevertheless pass through the system runs down into the drainage channel in the reinforcing frame.

The drainage channel, which is integrated in the reinforcing frame, contributes to carrying water away and down to drainage connection pieces, the water then being conducted onward to a suitable outlet. By virtue of the fact that the drainage duct is inclined in the longitudinal direction in either direction in relation to mechanism guides for the sun-roof, the number of drainage connection pieces can be reduced to only being located at the front on the sun-roof apparatus or, alternatively, only at the rear on the sun-roof apparatus.

BRIEF DESCRIPTION OF DRAWINGS

The invention will be described in greater detail below with reference to examples shown in the accompanying drawings, where.

DETAILED DESCRIPTION

Figure 1:
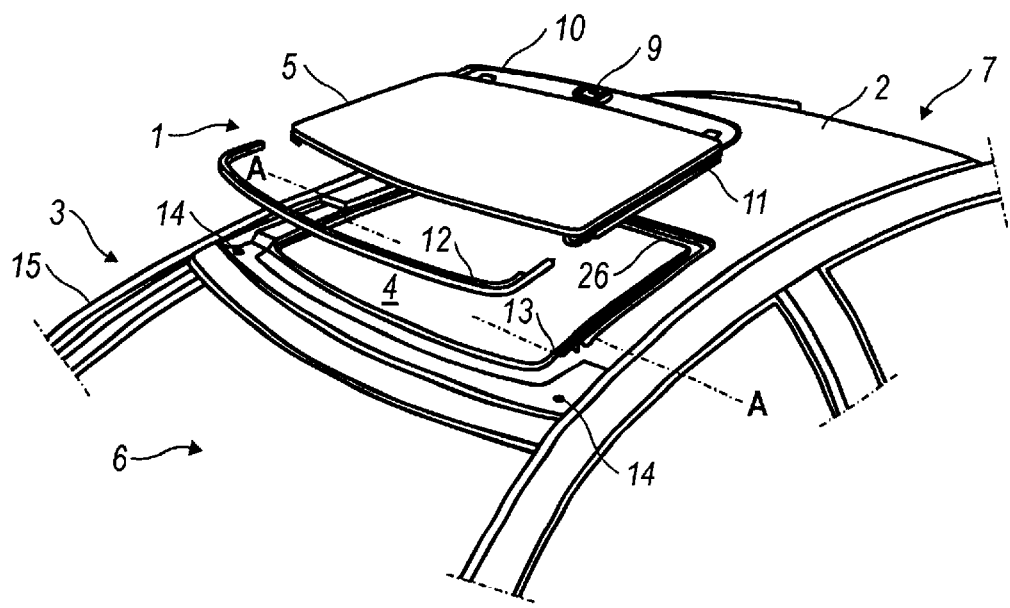
FIG. 1 shows a perspective view of a sun-roof apparatus arranged according to the present invention, in which a front portion of the roof that is in front of the section line A—A has been omitted for the sake of clarity.

Referring to the Figures, FIG. 1 shows the sun-roof apparatus 1 configured according to the present invention in a perspective view. In a roof 2 of a vehicle 3, there is an opening 4, in which a sun-roof 5 is intended to be arranged. The sun-roof 5 has in a rear region, in relation to a front and rear portions 6, 7 of the vehicle 3, a drive arrangement 8 for opening and closing the sun-roof 5. The drive arrangement 8 preferably consists of an electric motor 9 which, via cables 10, acts on a link mechanism with guides 11, which is arranged on each side of the sun-roof 5. Arranged in the front region of the sun-roof 5 is a wind deflector 12 which guides the airflow when the sun-roof 5 is open. In FIG. 1, the sun-roof 5 and the wind deflector 12 are shown at a distance from the opening 4.

FIG. 1 shows how, at the rear edge and side edge around the opening 4, the roof 2 is provided with a primary drainage gutter 26, the function of which is to conduct water to drainage connection pieces 14 which are arranged in the front corners of the drainage gutter 26. In FIG. 1, a reinforcing frame 13 is also shown, which will be described in greater detail below. The reinforcing frame 13 is arranged so as to reinforce the roof 2 of the vehicle 3 around the opening 4 and is designed to conduct water to the drainage connection pieces 14 which extend through the A pillars 15 of the vehicle. The roof 2 is not shown in its entirety at the front edge, but a part of the roof 2 has been omitted so as to show more clearly, among other things, the positioning of the drainage connection pieces 14.

Figure 2:
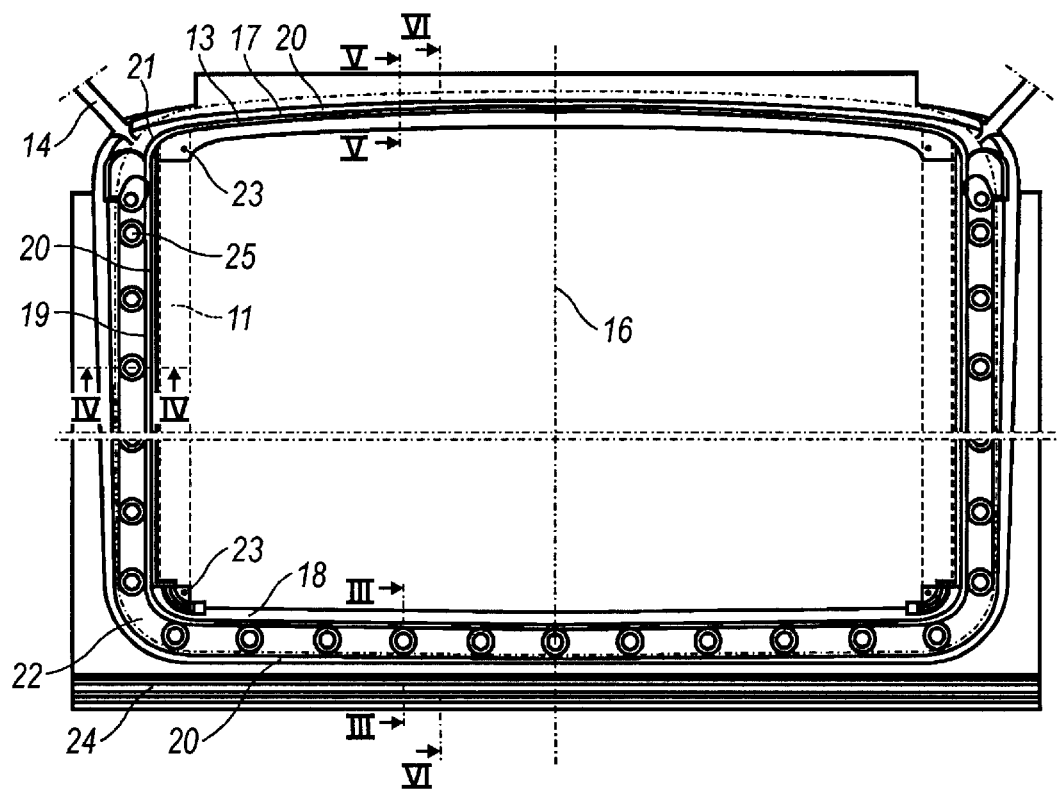
FIG. 2 shows a top view of a reinforcing frame configured according to the invention.

FIG. 2 shows a reinforcing frame 13 in a top view. According to the exemplary embodiment shown, the reinforcing frame 13 is essentially rectangular and has a front element 17, a rear element 18 and two side elements 19. The reinforcing frame 13 is preferably made in one continuous piece, as a compression-molded ring frame made of sheet metal. A drainage channel 20 is arranged in the reinforcing frame 13 and preferably extends around the entire reinforcing frame 13. That part of the drainage channel 20 which is arranged in the front element 17 constitutes primary drainage to the drainage connection pieces 14. Those parts of the drainage channel 20 which are arranged in the rear element 18 and in the side elements 19 constitute secondary drainage to the drainage connection pieces 14.

That part of the drainage channel 20 which is arranged in the side elements 19 of the reinforcing frame 13 are inclined so that the depth of the drainage channel 20 in a first end region 21 of the side element 19 which faces towards the front element 17 is greater than the depth of the drainage channel 20 in a second end region 22 of the side element 19 which faces towards the rear element 18.

The drainage connection pieces 14 are arranged in the first end region 21 of each side element 19. The drainage connection pieces 14 extend through the A pillars 15 of the vehicle 3 as described in connection with FIG. 1.

The reinforcing frame according to FIG. 2 includes fixing holes 23 for a link mechanism 11 that connects the sun-roof 5 to the reinforcing frame 13. The link mechanism 11 is indicated by dashed lines in FIG. 2. In the rear region of the reinforcing frame 13 a crossbeam 24 is formed, the function of which is to increase the rigidity of the roof 2. Arranged on the rear element 18 and side elements 19 of the reinforcing frame 13 are a number of projections 25 which are intended to bear against the roof 2 of the vehicle 3 and in particular, preferably against a part of the roof 2 which forms a primary drainage gutter 26 that will be described in greater detail in connection with FIG. 3. The reinforcing frame 13 is preferably connected to the roof 2 of the vehicle by means of spot welding.

Figure 3:
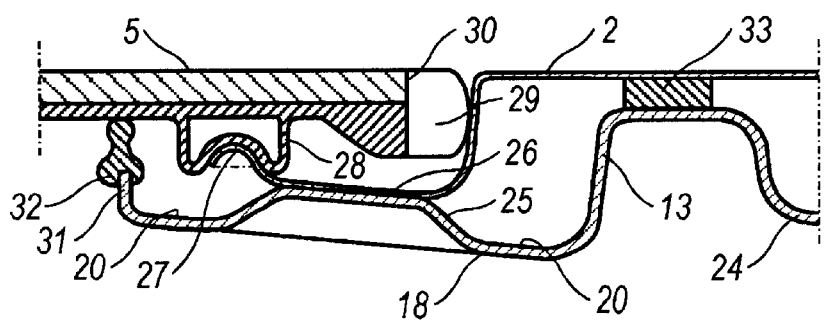
FIG. 3 shows a sectional view along the line III—III in FIG. 2.

FIG. 3 shows a section along the line III—III in FIG. 2. FIG. 3 also shows the sun-roof 5 and the roof 2 of the vehicle. The sun-roof 5 is shown in a closed position. The roof 2 is provided with a drainage gutter 26 which consists of a part which is integral with the roof 2. The drainage gutter 26 is preferably provided with a semi-circular edge 27 which is intended, in the closed position of the sun-roof 5, to interact sealingly with a secondary seal 28 which is arranged at a periphery of the sun-roof 5. A primary seal 29 is arranged on the outer edge 30 of the sun-roof 5 and bears sealingly against the roof 2 in the closed position of the sun-roof 5.

On an end edge 31, the reinforcing frame 13 is provided with a third seal 32 which, in the closed position of the sun-roof 5, bears sealingly against the underside of the sun-roof 5. A fourth seal 33 is arranged between the roof 2 and the reinforcing frame 13, which fourth seal 33 prevents water from leaking from the drainage channel 20 in the reinforcing frame 13 and backwards towards the crossbeam 24 which is formed in the rear region of the reinforcing frame 13.

If water should leak between the primary seal 29 and the roof 2, the drainage gutter 26 in the roof 2 receives the water and conducts it onward via the drainage channel 20 in the reinforcing frame 13 to the drainage connection pieces 14. If the leakage is very great and the vehicle 3 is parked in a backwardly inclined position, however, a great accumulation of water can be formed in the drainage gutter 26. If, in this position, the water should leak past the secondary seal 28, the drainage channel 20 in the reinforcing frame 13 receives the water and conducts it onward to the drainage connection pieces 14. This is brought about by virtue of the fact that the drainage channel 20 in the side elements 19 of the reinforcing frame 13 is inclined forwards, as described above.

FIG. 3 shows how a projection in the reinforcing frame 13 bears against the underside of the drainage gutter 26. As the projections 25 are positioned at a distance from one another, water can run between them.

Figure 4:
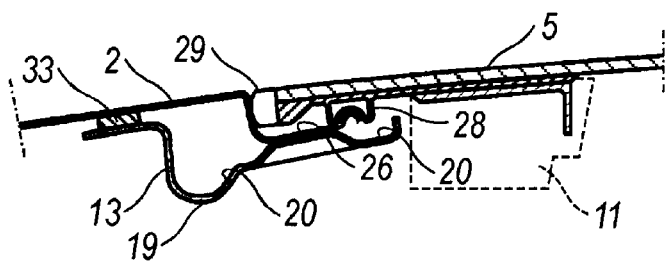
FIG. 4 shows a sectional view along the line IV—IV in FIG. 2.

FIG. 4 shows a section along the line IV—IV in FIG. 2. That part of the drainage channel 20 which is inclined forwards is located between the projections and the fourth seal 33. In FIG. 4, the link mechanism 11 is also indicated, which connects the sun-roof 5 to the reinforcing frame 13.

Figure 5:
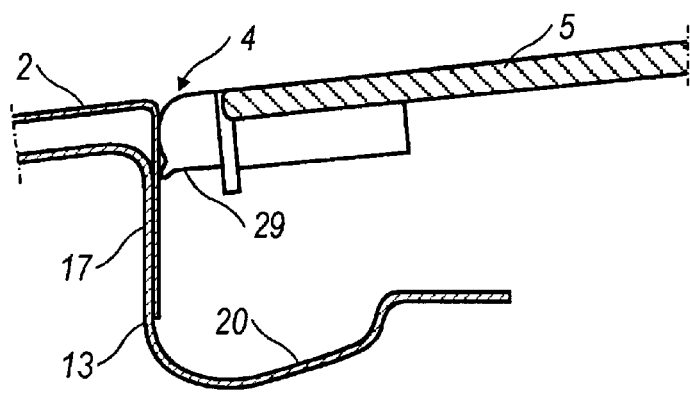
FIG. 5 shows a sectional view along the line V—V in FIG. 2.

FIG. 5 shows a section along the line V—V in FIG. 2. In the front region of the opening 4, the roof 2 is bent essentially at right angles and connected to the reinforcing frame 13 by means of spot welding.

Figure 6:
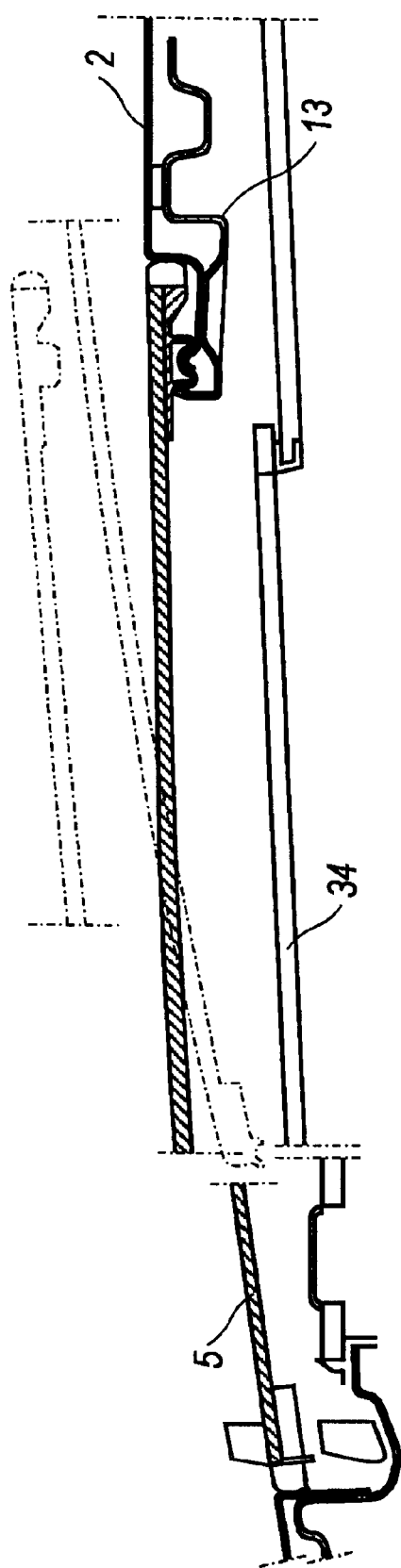
FIG. 6 shows a sectional view along the line VI—VI in FIG. 2 with a sun-roof shown in three different positions.

FIG. 6 shows a section along the line VI—VI in FIG. 2. In FIG. 6, it can be seen how the sun-roof 5 is opened. First, the rear region of the sun-roof 5 is opened by being angled upwards at the rear edge. Then, the sun-roof 5 is moved backwards in this angled position. FIG. 6 also indicates how an inner roof 34 is arranged in the opening 4. The inner roof 34 is suitably displaced backwards in a rail 35. The outer roof, that is to say the sun-roof 5, can be made of glass, sheet metal or another suitable material.

Figure 7:
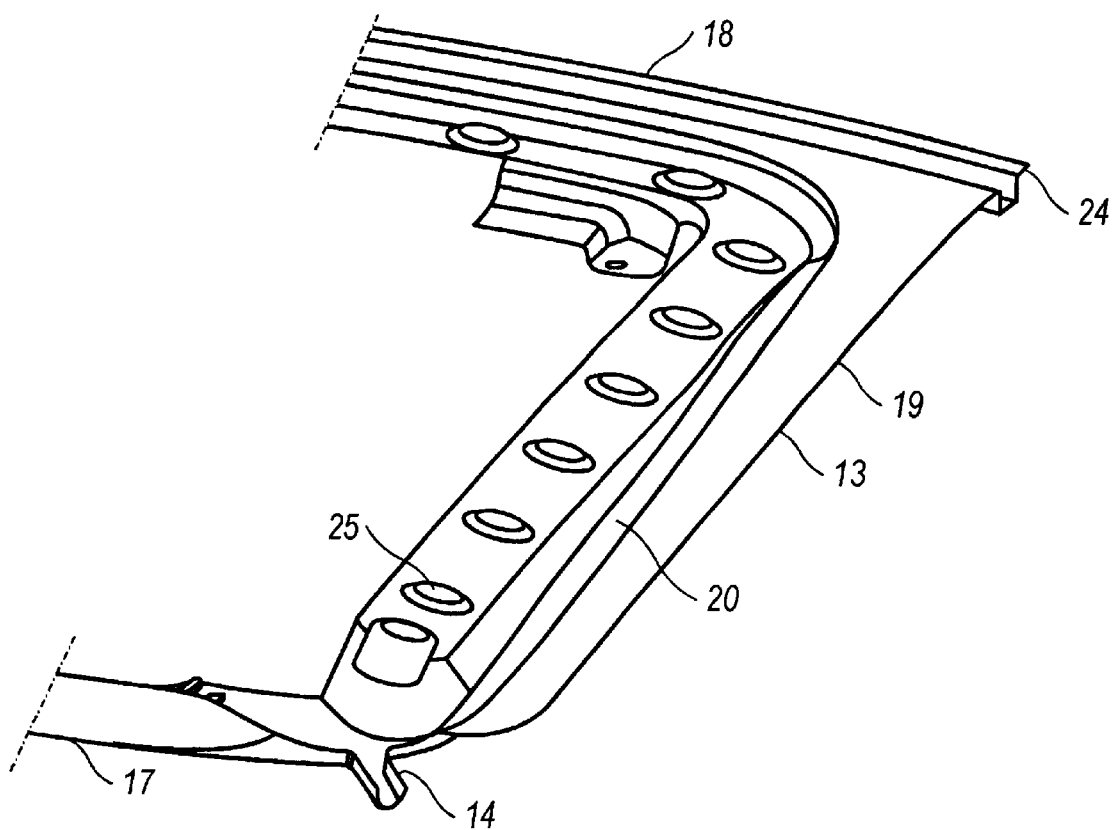
FIG. 7 shows a perspective view of a part of a reinforcing frame.

FIG. 7 shows a part of the reinforcing frame 13 in a perspective view. It can be seen clearly how the drainage channel 20 becomes deeper in the direction towards the front region of the reinforcing frame 13 and in the direction towards the drainage connection pieces 14.

It has been stated above that the drainage connection pieces are arranged in the reinforcing frame 13. It is also possible for the drainage connection pieces 14 to be arranged directly in the roof 2 of the vehicle 3 and in that case in communication with the drainage gutter 26. If the deepest part of the drainage channel 20 or the drainage gutter 26 is arranged in the other end region 22 of the side element 19, which faces towards the rear element 18, the drainage connection pieces 14 are preferably arranged in the rear element 18. The drainage connection pieces 14 then extend onward through the B pillars of the vehicle.

What is claimed is:

1. A sun-roof apparatus for a vehicle, the sun-roof apparatus comprising:

a sun-roof arranged in an opening in a roof of the vehicle, a link mechanism for connecting the sun-roof to the roof, a drainage gutter arranged at least partly around the opening in the roof, the drainage gutter being integral with the roof, a reinforcing frame arranged around the opening and connected to the roof at the drainage gutter, the reinforcing frame further comprising:

a front element in relation to a front portion of the vehicle, a rear element in relation to a rear portion of the vehicle, and two side elements, and a drainage channel arranged in the elements of the reinforcing frame, the drainage channel extending at least partly around the reinforcing frame, wherein the link mechanism is connected to the roof via the reinforcing frame, and wherein at least part of the drainage channel arranged in the side elements is inclined in relation to a horizontal plane, whereby the depth of the drainage channel in a first end region of the side elements is greater than the depth of the drainage channel in a second end region of the side elements.

2. The sun-roof apparatus according to claim 1, wherein a drainage connection piece connected to the drainage channel is arranged in that end region of the side elements where the drainage channel has the greatest depth.

3. The sun-roof apparatus according to claim 1, wherein the first end region of at least one of the side elements face towards the front element, and wherein the second end region of that side element faces towards the rear element, and wherein the drainage channel has the greatest depth in the first end region of the side element.

4. The sun-roof apparatus according to claim 1, wherein the reinforcing frame is made in one continuous piece.

5. The sun-roof apparatus according to claim 1, wherein the reinforcing frame is made from a compression-molded ring frame made of sheet metal.

6. The sun-roof apparatus according to claim 1, wherein the reinforcing frame is spot welded to the roof.

7. The sun-roof apparatus according to claim 1, further comprising a secondary seal mounted at the periphery of the sun-roof, wherein the secondary seal is arranged so as to bear against the drainage gutter in the roof in a closed position of the sun-roof.

8. The sun-roof apparatus according to claim 1, further comprising a primary seal mounted on the outer edge of the sun-roof, wherein the primary seal is arranged so as to bear against the roof in a closed position of the sun-roof.

9. A sun-roof apparatus arranged in a roof of a vehicle, said apparatus comprising:

a sun-roof arranged in an opening in the roof of the vehicle;

a link mechanism connecting the sun-roof to the roof;

a drainage gutter arranged at least partly around the opening in the roof and integral with the roof;

a reinforcing frame arranged around the opening and connected to that part of the roof that forms the drainage gutter; and a drainage channel arranged at least partly around and in the reinforcing frame, the drainage channel being arranged in a front element, a rear element and two side elements of the apparatus;

wherein the link mechanism connecting the sun-roof to the roof is connected to the roof via the reinforcing frame; and wherein a portion of the drainage channel arranged in one of the side elements is inclined in relation to a horizontal plane so that a depth of the portion of the drainage channel in a first region of one of side elements is greater than a depth of the portion of that drainage channel in a second end region of the side element.

10. The sun-roof apparatus according to claim 9, further comprising a drainage connection piece connected to the drainage gutter being arranged in that end region of the side elements where the drainage gutter has the greater depth.

11. The sun-roof apparatus according to claim 9 wherein the first end region of the side elements face towards the front element and the second end region of the side elements face towards the rear element; and wherein the drainage gutter has the greater depth in the first end region of the side elements.

12. The sun-roof apparatus according to claim 9 wherein the reinforcing frame is made in one continuous piece constructed from a compression-molded ring frame made of sheet metal.

13. The sun-roof apparatus according to claim 9, further comprising a secondary seal mounted at the periphery of the sun-roof and arranged to bear against the drainage gutter in the roof in a closed position of the sun-roof.

14. The sun-roof apparatus according to claim 9, further comprising:

a primary seal mounted on the outer edge of the sun-roof, the primary seal being arranged so that in a closed position of the sun-roof, the primary seal bears against the roof.

* * * * *